US012590191B2

(12) United States Patent
    Zhu et al.

(10) Patent No.: US 12,590,191 B2
(45) Date of Patent: Mar. 31, 2026

(54) LOW-ODOR SOFT PVC MATERIAL

(71) Applicant: KINGFA SCI. & TECH. CO., LTD.,
             Guangdong (CN)

(72) Inventors: Xiumei Zhu, Guangdong (CN); **Xianbo
             Huang, Guangdong (CN); Nanbiao Ye,**
             Guangdong (CN); Yusen Wang,
             Guangdong (CN); Guojie Yin,
             Guangdong (CN); Mingxing Xie,
             Guangdong (CN); Xiaoyun Yang,
             Guangdong (CN)

(73) Assignee: KINGFA SCI. & TECH. CO., LTD.,
             Guangdong (CN)

( * ) Notice: Subject to any disclaimer, the term of this
             patent is extended or adjusted under 35
             U.S.C. 154(b) by 793 days.

(21) Appl. No.: 17/788,744

(22) PCT Filed: Oct. 30, 2020

(86) PCT No.: PCT/CN2020/125101
    § 371 (c)(1),
    (2) Date: Jun. 24, 2022

(87) PCT Pub. No.: WO2021/129140
    PCT Pub. Date: Jul. 1, 2021

(65) Prior Publication Data
    US 2023/0059763 A1     Feb. 23, 2023

(30) Foreign Application Priority Data

Dec. 26, 2019    (CN) .......................... 201911371662.9

(51) Int. Cl.
    *C08J 3/20*        (2006.01)
    *C08K 3/26*        (2006.01)
    *C08K 5/00*        (2006.01)
    *C08K 5/098*       (2006.01)
(52) U.S. Cl.
    CPC    *C08J 3/20* (2013.01); *C08K 3/26* (2013.01);
                *C08K 5/0016* (2013.01); *C08K 5/005*
             (2013.01); *C08K 5/098* (2013.01); *C08J
             2327/06* (2013.01); *C08K 2003/265* (2013.01)
(58) Field of Classification Search
    CPC . C08J 3/20; C08J 2327/06; C08J 3/18; C08K
                3/26; C08K 5/0016; C08K 5/005; C08K
                5/098; C08K 2003/265; C08K 3/346;
             C08K 2003/3045; C08K 2201/007; C08K
                5/12; C08K 5/1345; C08K 5/18; C08K
                5/526; C08K 2201/011; C08K 13/02;

C08K 2201/003; C08K 2201/014; C08K
          3/013; C08K 3/30; C08K 3/34; C08K
          5/10; C08K 5/13; C08K 5/524; C08L
                                              27/06
    See application file for complete search history.

(56)                References Cited

U.S. PATENT DOCUMENTS 10,166,863 B1 *   1/2019   Herbert ..................... C08L 9/02
    2017/0015810 A1 * 1/2017   Miyazaki .................. C08J 5/18
    2017/0233567 A1 * 8/2017   Nishimura ........... B29C 41/003
                                                          428/424.6

FOREIGN PATENT DOCUMENTS

CN         102911459      2/2013
    CN         104448613      3/2015
    CN         104744847      7/2015
    CN         105176222     12/2015
    CN         106432948      2/2017
    CN         107337872     11/2017
    CN         108164863      6/2018
    CN         108192237      6/2018
    CN         108530792      9/2018
    CN         109467844      3/2019
    CN         111040338      4/2020

OTHER PUBLICATIONS

"International Search Report (Form PCT/ISA/210) of PCT/CN2020/
125101," mailed on Jan. 18, 2021, with English translation thereof,
pp. 1-5.

* cited by examiner

*Primary Examiner* — Alicia Bland
(74) *Attorney, Agent, or Firm* — JCIPRNET

(57)                ABSTRACT

Disclosed is a low-odor soft PVC material. The material
comprises the following components in parts by weight: 100
parts of a PVC resin, 60-125 parts of a plasticizer, 2-10 parts
of a heat stabilizer, 10-50 parts of a filler, 0-2 parts of an
antioxidant, 0.02-0.06 parts of a lubricant and 0.5-1 parts of
a deodorant. The PVC resin has a degree of polymerization
of lower than 1300; and the deodorant comprises nano
calcium carbonate and zinc ricinoleate. By selecting a PVC
resin with a low degree of polymerization and a deodorant
with a high deodorizing efficiency, the low-odor soft PVC
material of the present invention reduces odors from the
source, has a small overall impact on the appearance and
performance of automotive interior parts, and is low in cost
and suitable for large-scale production.

8 Claims, No Drawings

LOW-ODOR SOFT PVC MATERIAL

CROSS-REFERENCE TO RELATED APPLICATION

This application is a 371 of international application of PCT application serial no. PCT/CN2020/125101, filed on Oct. 30, 2020, which claims the priority benefit of China application no. 201911371662.9, filed on Dec. 26, 2019. The entirety of each of the above mentioned patent applications is hereby incorporated by reference herein and made a part of this specification.

TECHNICAL FIELD

The invention relates to the technical field of polymer materials, and in particular relates to a low-odor soft PVC material.

DESCRIPTION OF RELATED ART

Polyvinyl chloride (PVC) is widely used in various fields of daily life due to its low price, excellent performance, and easy processing. According to its plasticizer content, those with a plasticizer content of more than 30% are conventionally classified as soft PVC, which is widely used in automotive interiors.

The inherent characteristics of PVC are poor impact resistance and heat sensitivity, so various auxiliaries are often added in the modification process of PVC. For soft PVC, a large amount of plasticizer and stabilizer must be added. There are four main sources of odor of soft PVC: one is unreacted alcohol monomers and aldehyde compounds in upstream synthesis remaining in the plasticizer; the second is residual volatiles in the stabilizer, such as thiol compounds in thiol organotin; the third is trace hydrogen chloride and other molecules produced by degradation of PVC powder under an action of high temperature shearing; the fourth is other volatile substances produced by further interaction of all volatile small molecules during high temperature processing. These four sources eventually lead to problems such as high odor and high VOC content in soft PVC materials. With a full implementation of "China VI" standards, if it would like to continue to use soft PVC materials as automotive interior materials, its odor problem has evolved from a previous optional condition to today's entry threshold, and thus problem of high odor and high VOC must to be resolved.

In order to solve the odor problem of PVC materials, there have been some researches on patents. Chinese patent CN201410257480.X discloses a low-odor PVC composition used in field of coatings, which physically adsorbs odor by adding a combination of NaY molecular sieve and 4 A molecular sieve; however on one hand, the molecular sieve used has a large particle size, which is not conducive to being used in automotive interior materials; on the other hand, its processing temperature as a coating is relatively low, and at a higher processing temperature of modified plastics, the odor physically adsorbed by the molecular sieves cannot be guaranteed not to be released again, so it is not suitable for an odor improvement of modified PVC plastics. Patent CN201310725382.X discloses a PVC film material, which is deodorized by adding white activated carbon, but an addition amount of activated carbon is high, which will inevitably have a greater impact on physical properties of the PVC material. Patents CN201410693355 and 201610714766.5 disclose a low-odor PVC formula used as cable materials, in which an inorganic silicate deodorant is used, but a plasticizer proportion in the patent does not exceed 30%. After trials, this kind of deodorant has a weak effect on the formula of plasticizers with a wide variety and higher content (30%-50%) covered by the present patent. CN201710438307 also discloses a low-odor PVC powder for automotive interior parts, and a method for improving the odor is to introduce a physical adsorption deodorant, specifically at least one of nano calcium carbonate, nano zinc oxide, precipitated silica, fumed silica and hot-soluble gelatine powder, however an addition amount is 1%-5%, which is still relatively high. In order to reduce an impact on appearance and performance, it further introduces a coupling agent to perform surface modification of the deodorant. This adds a mixing process to the preparation method, which is time-consuming and labor-intensive and affects the production capacity.

SUMMARY

An objective of the present invention is to overcome the shortcomings of the prior art and provide a low-odor soft PVC material.

In order to achieve the above objective, the technical solution adopted in the present invention is: a low-odor soft PVC material, including the following components in parts by weight: 100 parts of a PVC resin, 60-125 parts of a plasticizer, 2-10 parts of a heat stabilizer, 10-50 parts of a filler, 0-2 parts of an antioxidant, 0.02-0.06 part of a lubricant and 0.5-1 part of a deodorant; a degree of polymerization of the PVC resin is less than or equal to 1,300; the deodorant contains nano calcium carbonate and zinc ricinoleate.

At present, the industrial PVC is mainly based on a suspension polymerization method, and a dispersant is used in the polymerization process. When types and amounts of the dispersant used in PVC with a high degree of polymerization are more, residues may be more, and most dispersants have a relatively strong odor. In addition, for PVC powder with an excessively high degree of polymerization, there is a problem that it is easier to generate heat by friction and generate low-molecular decomposition products. Therefore, in the present invention, it is selected PVC resin with a degree of polymerization $\leq$1300, which can effectively reduce generation of odor.

In addition, the PVC material of the present invention adopts the deodorant of the composite type of physical adsorption and chemical reaction, and the nano calcium carbonate is nano scale calcium carbonate, which has a relatively large specific surface area and has a strong surface adsorption effect on odor substances; zinc ricinoleate is rich in activated zinc atoms, which can form strong chemical bonds with atoms such as N and S in the odor to completely eliminate the odor. Furthermore, since the deodorant of the present invention actually introduces calcium-zinc ions into the PVC material, it can further improve the stability of the material, which may be another reason for its better deodorization effect. The inventors found that the deodorant effect of using a compounding of nano calcium carbonate with zinc ricinoleate is better than the effect of only using nano calcium carbonate and zinc ricinoleate, and is better than other commonly used deodorants (such as activated carbon, diatomaceous earth, nano zinc oxide, bentonite, etc.). Therefore, the deodorant has advantages of high deodorization efficiency, stable effect, small addition amount, little overall impact on appearance and performance of the manufactured automobile interior parts, which is suitable for large-scale production, and that deodorant formula is simple and easy to obtain, low cost and so on.

Due to a relatively small addition amount of nano calcium carbonate and zinc ricinoleate in the system, they are not easy to disperse in the system and have a poor compatibility with the matrix. Addition of a lubricant can ensure that nano calcium carbonate and zinc ricinoleate are fully dispersed in the material, which improves the compatibility of nano calcium carbonate and zinc ricinoleate with the matrix, thereby improving the deodorization effect. The lubricant is preferably at least one of esters, polyethylenes, stearic acids and paraffins.

The PVC material of the present invention is a soft PVC material, which has the characteristics of low odor, and is especially suitable for automobile interior materials.

Preferably, a weight ratio of the nano calcium carbonate to the zinc ricinoleate is (3-6.5):(3-6.5). When nano calcium carbonate and zinc ricinoleate are compounded by the above ratio, the deodorization effect is better.

Preferably, a particle size D50 of the nano calcium carbonate is 15-40 nm.

Preferably, the antioxidant is a hindered phenolic antioxidant and/or a hindered amine antioxidant.

Preferably, the antioxidant is a hindered phenolic antioxidant and a hindered amine antioxidant; a weight ratio of the hindered phenolic antioxidant and the hindered amine antioxidant is (1-3):(1-3). The inventors found that using a compounding of hindered phenolic antioxidant with hindered amine antioxidant can significantly reduce the odor of PVC material, which can significantly prevent oxidative aging of PVC and other polymer materials during processing, thereby reducing generation of volatiles and reducing the odor.

Preferably, the antioxidant is 0.2 to 1 part. When the antioxidant is a compounding of hindered phenolic antioxidant with hindered amine antioxidant, and when an addition amount of the antioxidant is above 0.2 parts, the odor of PVC can be effectively reduced, and when the addition amount is more than 1 part, the odor improvement effect is not significant, and a cost is increased.

Preferably, the hindered phenolic antioxidant is at least one of pentaerythritol tetrakis(β-(3,5-di-tert-butyl-4-hydroxyphenyepropionate), 1,3,5-trimethyl-2,4,6-tris(3,5-di-tert-butyl-4-hydroxybenzyl)benzene and tris(2,4-di-tert-butylphenyl)phosphite; the hindered amine antioxidant is 4,4'-bis(α,α-dimethylbenzyl)diphenylamine. The hindered phenolic antioxidants and the hindered amine antioxidant of the above types are preferably used, which can significantly reduce the odor of the PVC material.

Preferably, the heat stabilizer is a calcium-zinc heat stabilizer.

Preferably, the plasticizer is at least one of benzoates, polyol esters, epoxidized soybean oil, citric acid esters and polyesters.

Preferably, the plasticizer is at least one of dioctyl terephthalate, di(2-propylheptyl) phthalate and trioctyl trimellitate. When the plasticizers of the above types are used, the odor can be effectively reduced in the soft PVC material with a large addition amount of plasticizer.

Preferably, the filler is at least one of calcium carbonate, barium sulfate, talc and kaolin. The calcium carbonate in the filler is micron-level calcium carbonate, with a particle size being D50=1.5–10 μm.

Preferably, the PVC material further includes at least one of a light stabilizer, a reinforcing agent, a toughening agent, an antistatic agent and a coloring agent.

A preparation method of the PVC material of the present invention includes the following steps:
(a) weighing each component of the low-odor soft PVC material according to the specified parts by weight;
(b) adding a PVC resin powder, a plasticizer, a heat stabilizer and an antioxidant into a high-speed mixer, mixing for 8-15 min, and rising a temperature of the material to 110° C., wherein adding the plasticizer at twice, making the plasticizer fully absorbed by the PVC resin powder;
(c) adding a filler and a deodorant, and continuing to mix at a high speed for 3-5 min to fully mix the deodorant and powder material, and then stopping the machine to take out the material;
(d) transferring the hot material in the high-speed mixer to a low-speed cold mixer, starting the machine for low-speed mixing, reducing a temperature of the material to below 50° C.;
(e) putting the above-mentioned mixed materials into a two-stage extruder for extruding and granulating, in the two-stage extruder with a temperature of a twin-screw being 120° C.-130° C., and a temperature of a single-screw being 130° C.-140° C.; performing hot cutting of air-cooled die surface, to obtain the low-odor soft PVC material.

The beneficial effects of the present invention are as follows: the present invention provides a low-odor soft PVC material, and by selecting a PVC resin with a low degree of polymerization and a deodorant with a high deodorization efficiency, the low-odor soft PVC material of the present invention reduces odors from the source, has a small overall impact on the appearance and performance of automotive interior parts, and is low in cost and suitable for large-scale production.

DESCRIPTION OF THE EMBODIMENTS

In order to better illustrate the objectives, technical solutions and advantages of the present invention, the present invention will be further described below with reference to specific embodiments.

In Embodiments and Comparative Examples, each raw material was commercially purchased, wherein a PVC resin with a degree of polymerization being 1,300 has a trade mark of TK-1300, a PVC resin with a degree of polymerization being 1,000 has a trade mark of TK-1000, and the PVC with a degree of polymerization being 700 has a trade mark of TK-700;

A lubricant was purchased from Emery Oleochemicals (Germany) GmbH, model as LOXIOL P 861/3.5 (ester lubricant);

Dioctyl terephthalate was purchased from Guangzhou Weilianda Plasticizer Co., Ltd.;

Trioctyl trimellitate was purchased from Pauline Hong Kong Co., Ltd.;

Di(2-propylheptyl) phthalate was purchased from Guangzhou Weilianda Plasticizer Co., Ltd.;

Calcium-zinc heat stabilizer was purchased from Adeka Shanghai Trading Co., Ltd., model as RUP-108;

Zinc ricinoleate was purchased from Wenzhou Gray Chemicals;

A particle size D50 of nano calcium carbonate is 20 nm;

A particle size D50 of calcium carbonate is 4.5 μm;

Antioxidant 1010, pentaerythritol tetrakis(β-(3,5-di-tert-butyl-4-hydroxyphenyepropionate), was purchased from BASF;

Antioxidant 330, 1,3,5-trimethyl-2,4,6-tris(3,5-di-tert-butyl-4-hydroxybenzyl)benzene, was purchased from Foshan Yuansheng Chemical Co., Ltd.;

Antioxidant 168, tris(2,4-di-tert-butylphenyl)phosphite, was purchased from BASF;

Antioxidant KY-405, 4,4'-bis($\alpha$,$\alpha$-dimethylbenzyl)diphenylamine, was purchased from Jiangsu Feiya Chemical Industry Group.

The formula and test results of the low-odor soft PVC materials described in Examples 1 to 20 and Comparative Examples 1 to 5 are shown in Table 1 and Table 2.

A preparation method of the PVC material of Embodiments and Comparative Examples includes the following steps:

(a) weighing each component of the low-odor soft PVC material according to the specified parts by weight;

(b) adding a PVC resin powder, a plasticizer, a heat stabilizer and an antioxidant into a high-speed mixer, mixing for 8-15 min, and rising a temperature of the material to 110° C., wherein adding the plasticizer at twice, making the plasticizer fully absorbed by the PVC resin powder;

(c) adding a filler and a deodorant, and continuing to mix at a high speed for 3-5 min to fully mix the deodorant and powder material, and then stopping the machine to take out the material;

(d) transferring the hot material in the high-speed mixer to a low-speed cold mixer, starting the machine for low-speed mixing, reducing a temperature of the material to below 50° C.;

(e) putting the above-mentioned mixed materials into a two-stage extruder for extruding and granulating, with in the two-stage extruder a temperature of a twin-screw being 120° C.-130° C., and a temperature of a single-screw being 130° C.-140° C.; performing hot cutting of air-cooled die surface, to obtain the low-odor soft PVC material.

The test methods involved in Embodiments and Comparative Examples are as follows:

1. Shore hardness: ASTM D2240
2. Odor level: PV 3900-2000, the lower the grade is, the lower the odor is;
3. TVOC: TS-INT-002, the smaller the value is, the less the total volatiles are.

TABLE 1

| Component/ parts by weight | Embodiment 1 | Embodiment 2 | Embodiment 3 | Embodiment 4 | Embodiment 5 | Embodiment 6 |
|---|---|---|---|---|---|---|
| TK-1000 | 100 | 100 | 100 | 100 | — | — |
| TK-1300 | — | — | — | — | 100 | — |
| TK-700 | — | — | — | — | — | 100 |
| Dioctyl terephthalate | 90 | 90 | 90 | 90 | 90 | 90 |
| Calcium-zinc heat stabilizer | 4 | 4 | 4 | 4 | 4 | 4 |
| Calcium carbonate | 40 | 40 | 40 | 40 | 40 | 40 |
| Nano calcium carbonate | 0.75 | 0.65 | 0.3 | 0.2 | 0.65 | 0.65 |
| Zinc ricinoleate | 0.2 | 0.3 | 0.65 | 0.75 | 0.3 | 0.3 |
| Lubricant | 0.05 | 0.05 | 0.05 | 0.05 | 0.05 | 0.05 |
| Antioxidant 330 | 0.4 | 0.4 | 0.4 | 0.4 | 0.4 | 0.4 |
| Antioxidant KY-405 | 0.4 | 0.4 | 0.4 | 0.4 | 0.4 | 0.4 |
| Shore hardness/A | 61 | 61 | 60 | 61 | 67 | 58 |
| Odor level/level | 3.3 | 2.9 | 2.9 | 3.4 | 3.0 | 2.8 |
| TVOC/μg C/g | 21.9 | 12.9 | 14.1 | 24.0 | 14.8 | 10.6 |

| Component/ parts by weight | Embodiment 7 | Comparative Example 1 | Comparative Example 2 | Comparative Example 3 | Comparative Example 4 | Comparative Example 5 |
|---|---|---|---|---|---|---|
| TK-1000 | 100 | 100 | 100 | 100 | 100 | 100 |
| TK-1300 | — | — | — | — | — | — |
| TK-700 | — | — | — | — | — | — |
| Dioctyl terephthalate | 90 | 90 | 90 | 90 | 90 | 90 |
| Calcium-zinc heat stabilizer | 4 | 4 | 4 | 4 | 4 | 4 |
| Calcium carbonate | 40 | 40 | 40 | 40 | 40 | 40 |
| Nano calcium carbonate | 0.65 | — | 0.95 | — | — | 0.65 |

TABLE 1-continued

| | | | | | | |
|---|---|---|---|---|---|---|
| Zinc ricinoleate | 0.3 | 0.95 | — | — | — | 0.3 |
| Lubricant | 0.05 | 0.05 | 0.05 | — | — | — |
| Antioxidant 330 | — | 0.4 | 0.4 | 0.4 | — | 0.4 |
| Antioxidant KY-405 | — | 0.4 | 0.4 | 0.4 | — | 0.4 |
| Shore hardness/A | 62 | 60 | 61 | 61 | 61 | 61 |
| Odor level/ level | 3.4 | 3.6 | 3.7 | 3.9 | 4.5 | 3.5 |
| TVOC/μg C/g | 22.0 | 25.1 | 25.7 | 30.3 | 44.8 | 25.1 |

TABLE 2

| Component/ parts by weight | Embodiment 8 | Embodiment 9 | Embodiment 10 | Embodiment 11 | Embodiment 12 | Embodiment 13 | Embodiment 14 |
|---|---|---|---|---|---|---|---|
| TK-1000 | 100 | 100 | 100 | 100 | 100 | 100 | 100 |
| Dioctyl-terephthalate | 90 | 90 | 90 | 90 | 90 | 90 | 90 |
| Trioctyl trimellitate | — | — | — | — | — | — | — |
| Di(2-propyl-hepty 1) phthalate | — | — | — | — | — | — | — |
| Calcium-zinc heat stabilizer | 4 | 4 | 4 | 4 | 4 | 4 | 4 |
| Calcium carbonate | 40 | 40 | 40 | 40 | 40 | 40 | 40 |
| Nano calcium carbonate | 0.65 | 0.65 | 0.65 | 0.65 | 0.65 | 0.65 | 0.65 |
| Zinc ricinoleate | 0.3 | 0.3 | 0.3 | 0.3 | 0.3 | 0.3 | 0.3 |
| Lubricant | 0.05 | 0.05 | 0.05 | 0.05 | 0.05 | 0.05 | 0.05 |
| Antioxidant 1010 | — | — | 0.4 | — | 0.2 | 0.4 | — |
| Antioxidant 330 | 0.8 | — | 0.4 | 0.4 | 0.2 | — | — |
| Antioxidant 168 | — | — | — | 0.4 | 0.4 | — | 0.4 |
| Antioxidant KY-405 | — | 0.8 | — | — | — | 0.4 | 0.4 |
| Shore hardness/A | 62 | 61 | 61 | 60 | 60 | 61 | 61 |
| Odor level/ level | 3.2 | 3.4 | 3.2 | 3.2 | 3.2 | 2.9 | 3.0 |
| TVOC/μg C/g | 20.3 | 20.9 | 19.7 | 18.5 | 19.3 | 13.5 | 14.6 |

| Component/ parts by weight | Embodiment 15 | Embodiment 16 | Embodiment 17 | Embodiment 18 | Embodiment 19 | Embodiment 20 |
|---|---|---|---|---|---|---|
| TK-1000 | 100 | 100 | 100 | 100 | 100 | 100 |
| Dioctyl-terephthalate | 90 | 90 | 90 | — | 125 | — |
| Trioctyl trimellitate | — | — | — | 60 | — | — |
| Di(2-propyl-heptyl) phthalate | — | — | — | — | — | 110 |
| Calcium-zinc heat stabilizer | 4 | 4 | 4 | 6 | 2 | 10 |
| Calcium carbonate | 40 | 40 | 40 | 50 | 10 | 30 |
| Nano calcium carbonate | 0.65 | 0.65 | 0.65 | 0.65 | 0.25 | 0.65 |

TABLE 2-continued

| | | | | | | |
|---|---|---|---|---|---|---|
| Zinc ricinoleate | 0.3 | 0.3 | 0.3 | 0.3 | 0.25 | 0.3 |
| Lubricant | 0.05 | 0.05 | 0.05 | 0.05 | 0.025 | 0.05 |
| Antioxidant 1010 | — | — | — | — | — | — |
| Antioxidant 330 | 0.1 | 0.5 | 0.6 | 0.4 | 0.4 | 0.4 |
| Antioxidant 168 | — | — | — | — | — | — |
| Antioxidant KY-405 | 0.1 | 0.5– | 0.6 | 0.4 | 0.4 | 0.4 |
| Shore hardness/A | 61 | 60 | 60 | 71 | 50 | 54 |
| Odor level/level | 3.0 | 2.9 | 2.9 | 3.0 | 2.8 | 3.0 |
| TVOC/μg C/g | 15.2 | 12.2 | 12.1 | 15.5 | 10.5 | 14.8 |

Note:
"—" indicates that the substance is not added.

Generally speaking, an odor level higher than 3.5 is unacceptable to most users, and an odor level lower than or equal to 3.0 can meet the needs of most users.

As can be seen from the test results in Table 1 and Table 2, compared with no deodorant used or only nano calcium carbonate or zinc ricinoleate used, when a compounding of nano calcium carbonate with zinc ricinoleate is used, an odor level and a tested TVOC content is both lower, indicating the compounding of nano calcium carbonate with zinc ricinoleate has a higher deodorization efficiency; when a ratio of nano calcium carbonate to zinc ricinoleate is (3-6.5):(3-6.5), a deodorization effect is even better, reducing the odor level to below 3.0, which can meet the needs of most users. And an addition of a lubricant can effectively improve the deodorization effect. Compared with only a hindered phenolic antioxidant or a hindered amine antioxidant added, when a compounding of hindered phenolic antioxidant with hindered amine antioxidant is used, an odor level and a TVOC content is lower. When the compounding of hindered phenolic antioxidant with hindered amine antioxidant is added above 0.2 parts, the odor level can be reduced to below 3.0, however when an addition amount of the antioxidant is larger than 1 part, increasing the amount of the antioxidant again is difficult to continue to reduce the odor, and the cost increases.

Finally, it should be noted that the above embodiments are only used to illustrate the technical solutions of the present invention and not to limit the protection scope of the present invention. Although the present invention is described in details with reference to the preferred embodiments, those of ordinary skill in the art should understand that the technical solutions of the present invention may be modified or equivalently replaced without departing from the spirit and scope of the technical solutions of the present invention.

What is claimed is:

1. A low-odor soft polyvinyl chloride (PVC) material, comprising the following components in parts by weight: 100 parts of a PVC resin, 60-125 parts of a plasticizer, 2-10 parts of a heat stabilizer, 10-50 parts of a filler, 0.2-2 parts of an antioxidant, 0.02-0.06 part of a lubricant and 0.5-1 part of a deodorant; a degree of polymerization of the PVC resin is less than or equal to 1,300; the deodorant contains nano calcium carbonate and zinc ricinoleate, wherein a weight ratio of the nano calcium carbonate to the zinc ricinoleate is 3-6.5:3-6.5, wherein the antioxidant is a hindered phenolic antioxidant and a hindered amine antioxidant, and a weight ratio of the hindered phenolic antioxidant to the hindered amine antioxidant is 1-3:1-3;

wherein the hindered phenolic antioxidant is at least one of pentaerythritol tetrakis(β-(3,5-di-tert-butyl-4-hydroxyphenyl)propionate), 1,3,5-trimethyl-2,4,6-tris(3, 5-di-tert-butyl-4-hydroxybenzyl)benzene and tris(2,4-di-tert-butylphenyl)phosphite, and the hindered amine antioxidant is 4,4'-bis(α,α-dimethylbenzyl)diphenylamine.

2. The low-odor soft PVC material according to claim 1, wherein a particle size D50 of the nano calcium carbonate is 15-40 nm.

3. The low-odor soft PVC material according to claim 1, wherein the antioxidant is 0.2 to 1 part.

4. The low-odor soft PVC material according to claim 1, wherein the heat stabilizer is a calcium-zinc heat stabilizer.

5. The low-odor soft PVC material according to claim 1, wherein the plasticizer is at least one of benzoates, polyol esters, epoxidized soybean oil, citric acid esters and polyesters.

6. The low-odor soft PVC material according to claim 1, wherein the filler is at least one of calcium carbonate, barium sulfate, talc and kaolin.

7. The low-odor soft PVC material of claim 1, wherein the PVC material further comprises at least one of a light stabilizer, a reinforcing agent, a toughening agent, an antistatic agent and a coloring agent.

8. The low-odor soft PVC material according to claim 5, wherein the plasticizer is at least one of dioctyl terephthalate, di(2-propylheptyl) phthalate and trioctyl trimellitate.

* * * * *